Feb. 18, 1936.   E. J. VON HENKE   2,031,082
WELDING MACHINE
Filed Feb. 5, 1934   3 Sheets-Sheet 1

INVENTOR
Edmund J. Von Henke
BY
Gifford, Snull & Bergen
ATTORNEYS.

Feb. 18, 1936.  E. J. VON HENKE  2,031,082
WELDING MACHINE
Filed Feb. 5, 1934  3 Sheets-Sheet 2

INVENTOR
Edmund J. Von Henke
BY
Gifford, Scull & Burgess
ATTORNEYS

Feb. 18, 1936.  E. J. VON HENKE  2,031,082
WELDING MACHINE
Filed Feb. 5, 1934  3 Sheets-Sheet 3
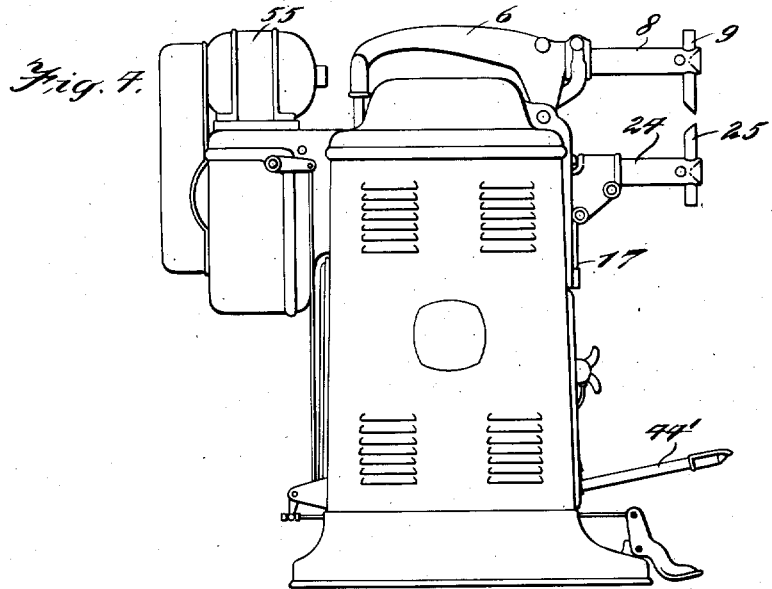
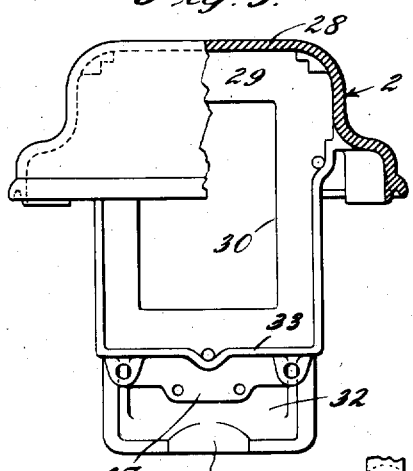
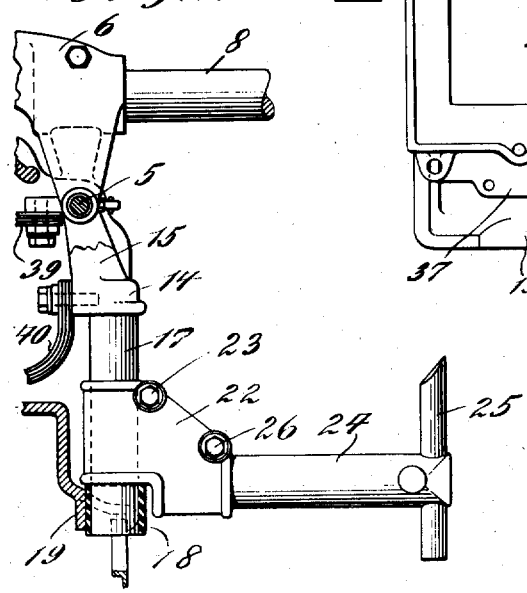
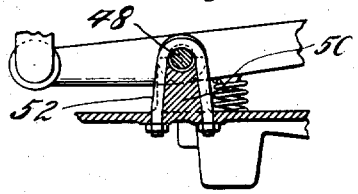
INVENTOR
Edmund J. Von Henke
BY
Gifford, Scull & Burgess
ATTORNEYS.

UNITED STATES PATENT OFFICE 2,031,082

WELDING MACHINE

Edmund J. von Henke, Chicago, Ill., assignor to American Electric Fusion Corporation, Chicago, Ill., a corporation of Illinois Application February 5, 1934, Serial No. 709,679

6 Claims. (Cl. 219—4)

This invention relates to a novel and improved form of welding machine, the novel features of which will be better understood by reference to the accompanying drawings in which I have shown selected embodiments of the various novel features, and in which:

Fig. 4 is a side elevation of a machine likewise embodying the invention and equipped for continuous operation;

Fig. 5 is a view, partly in elevation and partly in section, showing the head of the casing as viewed from the left of Fig. 1 and with all other parts omitted;

Fig. 6 is a section on the line 6—6 of Fig. 3;

Fig. 7 is a fragmentary view showing part of the structure appearing in Fig. 1, but in a different position.

The invention is shown as embodied in a machine having a base 1, preferably in the form of a single casting, and a head 2 which is also in the form of one piece of cast metal. These members 1 and 2 are connected by vertically extending walls to form a complete casing. These walls may be formed of sheet metal, and their edges may be welded together as by spot welding to form a column rectangular in cross-section, which may be readily combined with the base and head to form the completed casing. The parts may be held together by vertically extending tie-bolts 3, as plainly indicated in Fig. 1.

Figure 2:
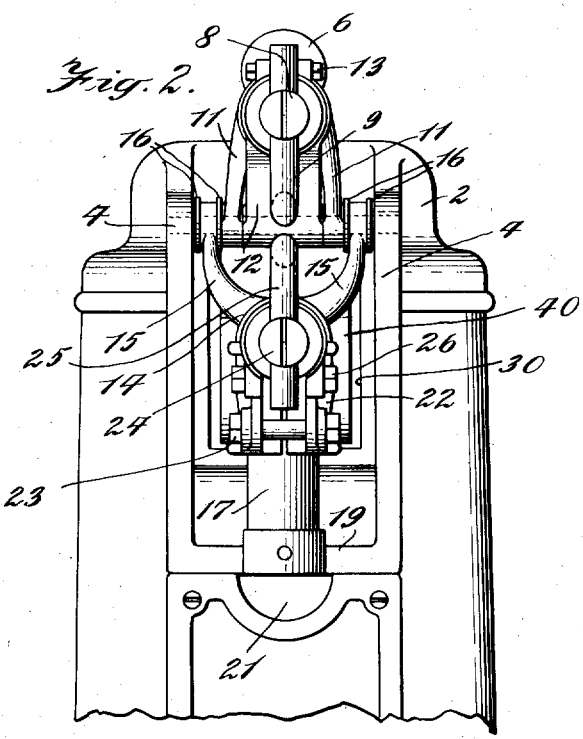
Fig. 2 is a view of the upper part of Fig. 1, taken from the right of that figure.
Figure 3:
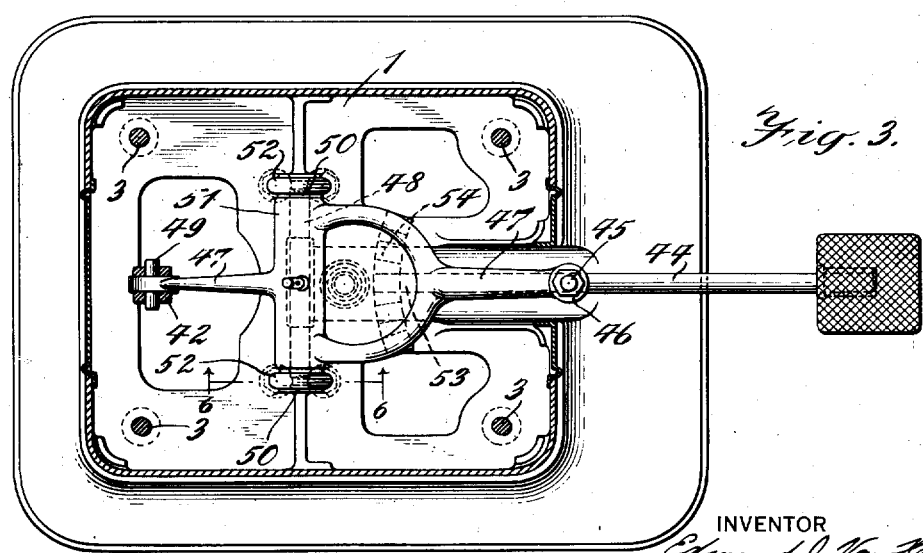
Fig. 3 is a section approximately on the line 3—3 of Fig. 1.

The head 2, as best shown in Fig. 2, has spaced bearings 4 in which is supported a transversely extending pivot pin 5. In the form shown, this pin is fixed in position in the bearings 4, and pivotally mounted thereon is a rocker arm 6 having a bore 7 in which is received the horn 8 of an electrode 9. This horn may be clamped in the bore as by a bolt 10. The rocker arm is preferably supported on the pivot by downwardly extending legs 11, between which is received a socket piece 12 likewise pivoted on the pin 5 and having a socket within which is received the horn 8 which may be clamped in the socket by the bolt 13, it being understood that this socket is split for that purpose.

Likewise mounted upon the pivot pin 5 is a bracket 14 having opposite legs 15 pivotally receiving the pin 5 on the outside of the legs 11, as plainly shown in Fig. 2. The legs 15 are suitably insulated from other metal parts by the bushings 16.

The bracket 14 has depending therefrom a swivel post 17 having on its lower end an insulating bushing 18, and this post is received against a bearing 19 on the lower part of the head. The front plate 20 of the casing is recessed at 21 so that the post will not contact therewith.

Slidably mounted on the post 17 is a socket piece 22 which may be clamped in fixed position on the post by means of a bolt 23 and which likewise has a socket receiving the horn 24 which supports the electrode 25. The horn may be clamped in the socket piece by a bolt 26, and it is of course understood that the electrodes may be held in place in the horns by means of the bolts or other locking means 27.

The arrangement just described is one in which it will be seen that the lower electrode 25 is held in position to cooperate with the upper electrode 9 by a very simple arrangement. The one pivot pin serves to support the rocker arm and the bracket for the lower electrode as well. The weight of the electrode 25, the horn 24, and the socket piece 22, as well as the weight of the swivel post itself and the bracket on which it is mounted, will tend to cause rotation of all these parts about the pivot 5 in a clockwise direction, as viewed in Fig. 1, it being seen that substantially all of these parts are disposed forwardly of a vertical plane through the axis of that pivot. By this arrangement, the parts just enumerated are easily mounted and held in position without complicated fastening means. Other advantages will also be apparent to those skilled in the art.

Depending from the top 28 of the head is a wall 29 having an opening 30 therein, and this wall terminates in a horizontally extending shelf 31 which is connected to the face 32 of the head. It is on this face 32 that the bearing 19 is located. On the rear of the wall 29 is a shelf 33 to support the primary 34 of a transformer. The transformer may be held against the wall by a clamping frame 35 held to the wall by bolts 36. Likewise depending from the wall 29 is a projection 37 to support the conductor 38, by means of which current may be conducted to the transformer.

The transformer may also include a secondary, the opposite ends 39 and 40 of which are connected, respectively, to the socket piece 12 and the bracket 14. The socket piece 12 is provided with a lug 41 with which the end 39 of the secondary may contact and to which it may be bolted as indicated. The end 40 may likewise be bolted directly to the bracket 14, as shown in Fig. 1.

Figure 1:
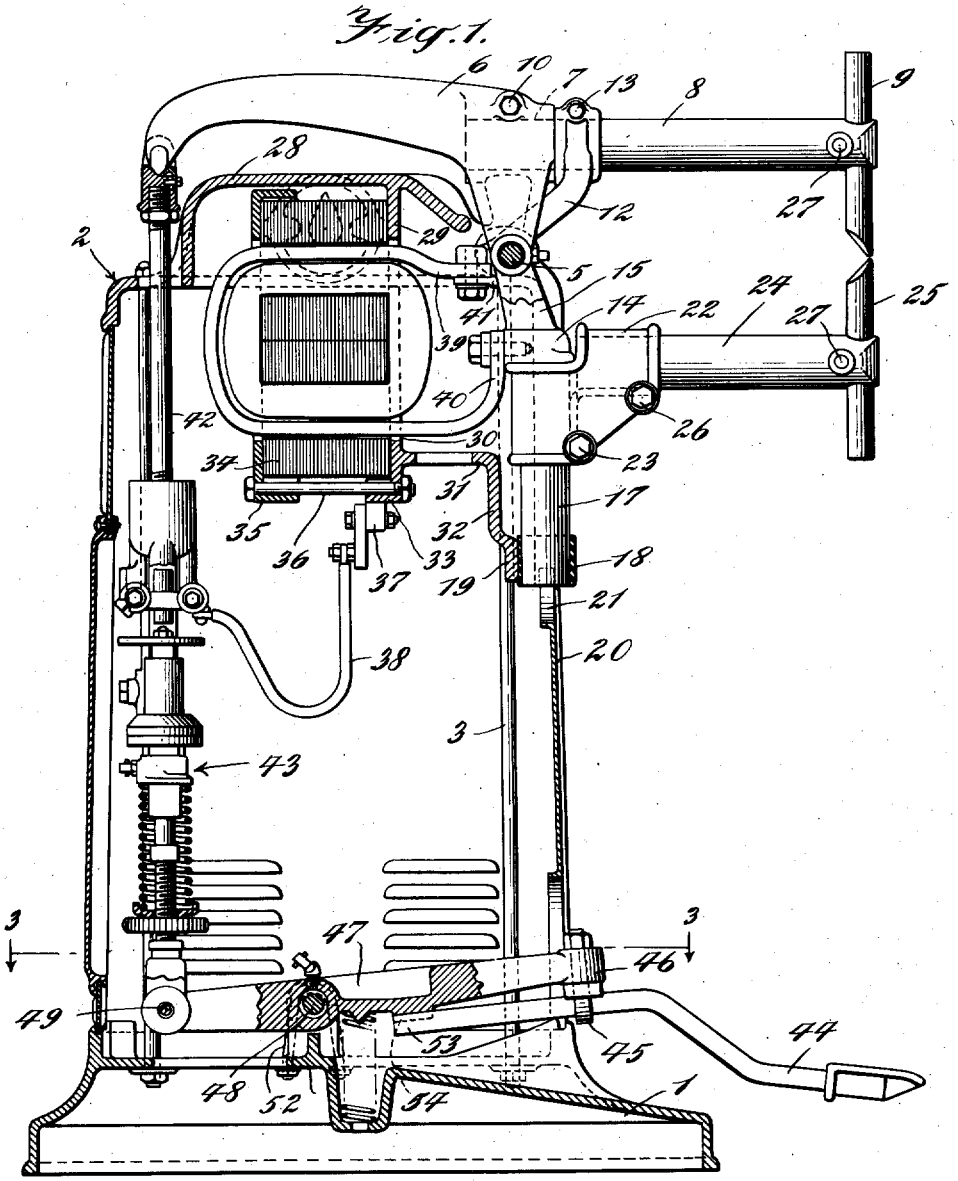
Fig. 1 is a vertical sectional view through a machine constructed according to my invention.

The rocker arm 6 may be moved upon the pivot pin 5, and normally the bracket 14 will be stationary on that pivot, although capable of movement in a counterclockwise direction thereon, as viewed in Fig. 1. The movement of the rocker arm is for the purpose of bringing the electrode 9 into and out of operative relation to the electrode 25, and this may be done by a vertically extending connecting member 42 extending through the head 2 and into the interior of the casing. There it is connected to a switch operating mechanism indicated generally by the numeral 43. The details of this mechanism may be the same as those in my prior Patent 1,843,937, and therefore a further detailed description thereof will not be given. This switch mechanism is designed to control passage of current through the conductor 38 to the transformer and is operated by means of a treadle 44 passing through an eye-bolt 45, which in turn may be pivoted in the eye 46 disposed at one end of a treadle arm 47. This arm is rotatably mounted upon a pivot pin 48 and has its opposite end pivotally secured at 49 to the lower end of the connecting member 42. This "connecting member" may comprise several separate elements connected together, but for the purpose of this application, these elements may be considered as one member.

The pivot pin 48 is supported in a pair of spaced upwardly extending lugs 50, one at each end of the bearing 51 of the treadle arm, and may be held in these lugs as by U-bolts 52. The treadle 44 may be swung horizontally to different positions by means of the pivotal connection previously described, and may be held in selected position by engagement of a tooth 53 engaging with teeth 54 on the treadle arm.

In operation, the treadle may be depressed to close the switch, which in turn controls the flow of current to the primary of the transformer, and also to bring the electrodes 9 and 25 into operative relation with each other and the work which is held therebetween in any suitable manner. Current will flow through the horns and electrodes and through the work between the electrodes, all in a manner well known in the art. This current is rendered more effective by the use of the socket piece 12 which may be made of copper or other material of high conductivity. In other words, the rocker arm 6 is one which requires structural strength in order to operate the horn 8 and electrode 9 carried thereby and therefore should be made of some metal which is strong enough to perform this function without undue danger of breakage. For example, if the arm 6 is made of cast iron or cast steel, the conductivity of that metal is not as good as copper which, on the other hand, is not as good a structural material as the other metals mentioned. The socket piece 12, however, provides a sufficient conductivity independently of the support and structural strength furnished by the rocker arm 6. On the other hand, the bracket 14 is so located that it does not require the same structural strength as the rocker arm 6 does, and this may be made of suitable conductive material, such as copper, as may also the socket piece 22. The horns 8 and 24 are of conductive material, as well known in the art.

Referring to Fig. 4, the structure shown therein is essentially the same as that which has been described above, but here, instead of the mechanism being operated by the treadle, the treadle 44' may be used to control the operation of a motor 55 which causes the electrodes 9 and 25 to be brought together at regular intervals. The motor operates suitable mechanism known in the art which will achieve this purpose, and since that mechanism is well known, no further description thereof is given here.

Referring now to Fig. 7, I have shown therein certain parts appearing in Fig. 1, but in different positions. For example, in this figure the socket piece 12 has been omitted, as may be done if the material of the rocker arm 6 is of sufficiently good conductivity to supply current to the electrode carried by the horn 8. The swivel post 17 carries the socket piece 22, but in this instance this socket piece is reversed from the position occupied by it in Fig. 1 and has likewise been moved to a point adjacent the bottom of the post. This will indicate the flexibility of the arrangement disclosed herein.

While I have shown the invention as embodied in specific forms, it is to be understood that various changes in details may be made without departing from the scope of the invention, and I therefore do not intend to limit myself except by the appended claims.

I claim:

1. In a welding machine, a base having a support extending upwardly therefrom, a horizontally extending pin mounted on said support, two members both pivotally mounted on said pin, one extending upwardly and the other downwardly therefrom and one resting against said support to prevent rotation on the pivot in one direction, horns mounted in said members, and electrodes mounted in said horns and facing towards each other whereby upon pivotal movement of said members with respect to each other said electrodes may be brought into close proximity to weld work therebetween, and means for supplying electric current to said electrodes.

2. In a welding machine, a horizontally extending pin, a bracket suspended on said pin, a horn supported on said bracket and extending outwardly therefrom, an electrode on said horn, the center of gravity of said bracket and parts carried thereby being located on one side of a vertical plane through the axis of said pin to thereby create a tendency to rotate on said pin, and a bearing on the machine preventing such rotation.

3. In a welding machine, a horizontally extending pin, a bracket suspended on said pin, a downwardly extending post on said bracket, a socket piece slidably mounted on said post, a horn supported in said socket piece and in turn supporting an electrode, the axis of said post being located eccentrically to the axis of the pin, and a bearing on the machine engaging said post to prevent rotation around said pin because of said eccentricity.

4. In a welding machine, a horizontally extending pin, a bracket suspended on said pin, a downwardly extending post on said bracket, a socket piece extending lengthwise of and slidably mounted on said post, and a horn carrying an electrode and supported in said socket piece adjacent one end thereof, whereby reversal of the socket piece on the post will change the position of the electrode.

5. In a welding machine, a casing having a head provided with a face forming part of the front of the casing, said face comprising a vertically extending wall set back from the front of the casing below it and having an opening therein, a transformer mounted on said wall and having a secondary with ends extending through said pening, two electrodes connected to the opposite ends of said secondary and mounted on members pivoted on said head in front of said opening for pivotal motion with respect to each other, means for causing said pivotal motion, and means for supplying current to said transformer.

6. In a welding machine, a casing having a head with an opening through a vertically extending wall thereof, a horizontally extending pin mounted on said head outside said casing and adjacent said opening, a transformer supported on said head within said casing, two electrodes pivotally mounted upon said pin, connections from the secondary of said transformer to said electrodes and extending through said opening, means to cause pivotal motion of one of said electrodes towards the other, and means on the casing preventing rotation of the other electrode in the same direction.

EDMUND J. von HENKE.